United States Patent
Kobayashi

(10) Patent No.: US 7,924,510 B2
(45) Date of Patent: Apr. 12, 2011

(54) IMAGING LENS AND IMAGING APPARATUS EQUIPPED WITH THE IMAGING LENS

(75) Inventor: Hiroaki Kobayashi, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 441 days.

(21) Appl. No.: 12/121,442

(22) Filed: May 15, 2008

(65) Prior Publication Data

US 2008/0285159 A1   Nov. 20, 2008

(30) Foreign Application Priority Data

May 18, 2007   (JP) .................. P2007-132334

(51) Int. Cl.
*G02B 9/34*   (2006.01)
*G02B 13/18*   (2006.01)
*G02B 3/02*   (2006.01)
(52) U.S. Cl. ........................ 359/781; 359/715
(58) Field of Classification Search .............. 359/771, 359/781, 715
See application file for complete search history.

(56) References Cited

U.S. PATENT DOCUMENTS 3,838,911 A * 10/1974 Ikeda ...................... 359/771

FOREIGN PATENT DOCUMENTS

| JP | 55-45007 A | 3/1980 |
| JP | 61-90115 A | 5/1986 |
| JP | 2002-162562 A | 6/2002 |
| JP | 2004-354572 A | 12/2004 |
| JP | 2005-24969 A | 1/2005 |

* cited by examiner

*Primary Examiner* — Alicia M Harrington
(74) *Attorney, Agent, or Firm* — Birch, Stewart, Kolasch & Birch, LLP

(57) ABSTRACT

An imaging lens is provided and includes: in order from the object side, a first lens group including a biconcave lens; a second lens including two lenses whose convex surfaces are arranged opposite to each other and having a positive refractive power as a whole; a third lens group including a biconcave lens; and a fourth lens group including two lenses whose convex surfaces are arranged opposite to each other and having positive refractive power, as a whole, the imaging lens satisfying the specific condition.

15 Claims, 12 Drawing Sheets

EXAMPLE 1

EXAMPLE 1

EXAMPLE 2

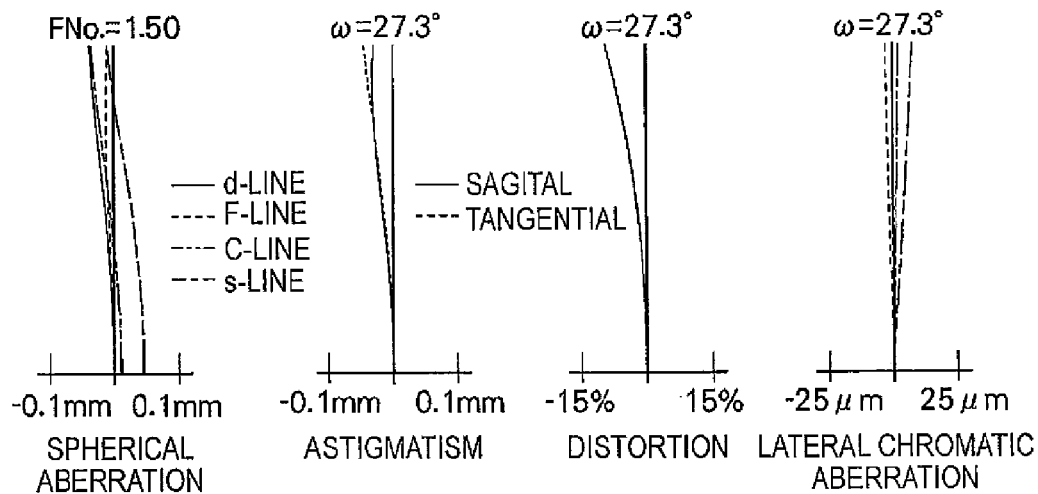
FIG. 14 EXAMPLE 1
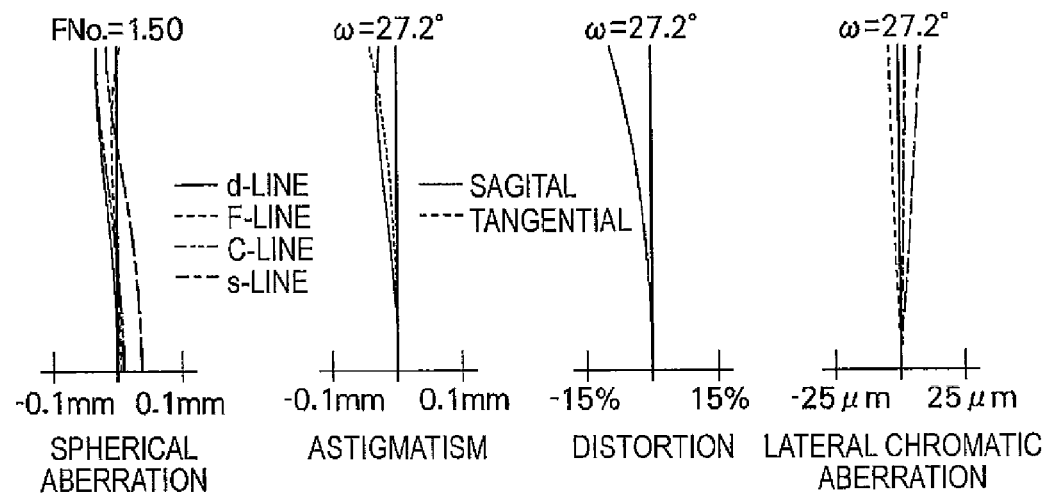
FIG. 15 EXAMPLE 2
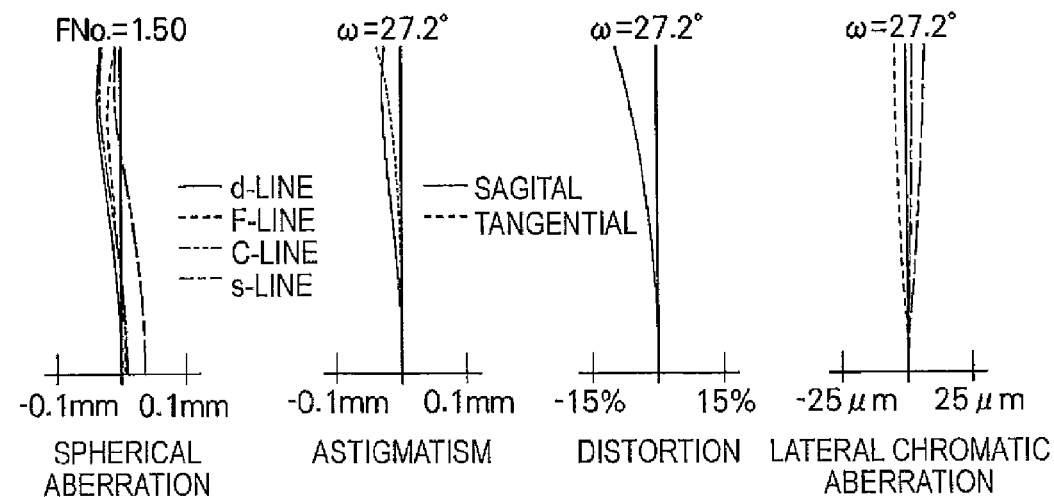
FIG. 16 EXAMPLE 3

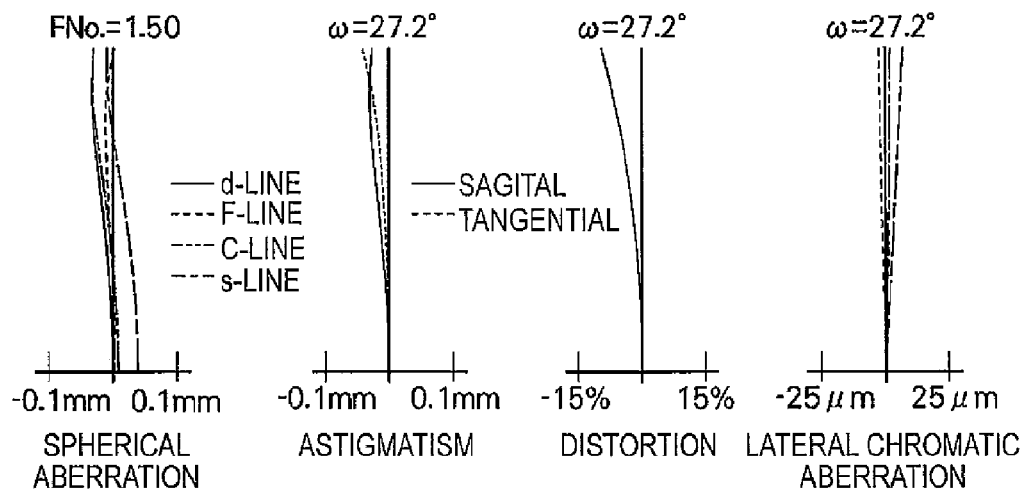
FIG. 17 EXAMPLE 4
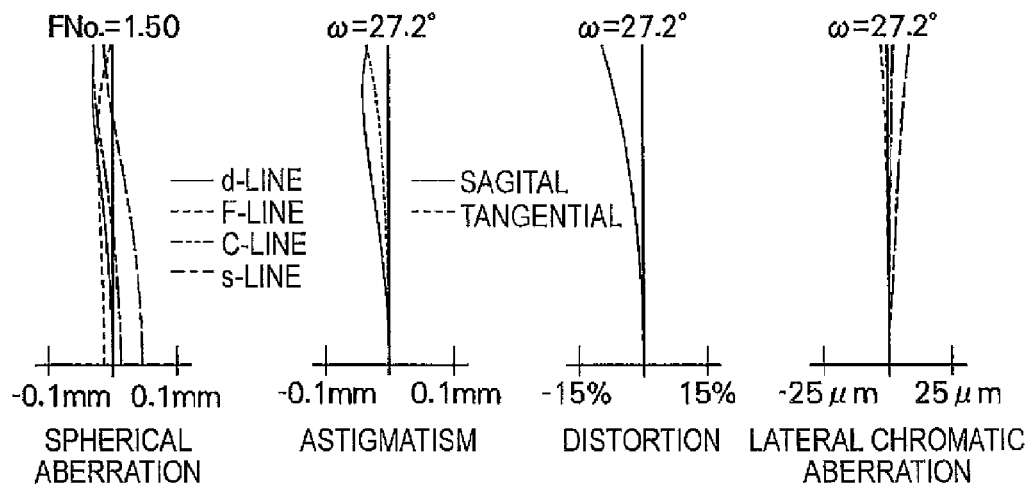
FIG. 18 EXAMPLE 5
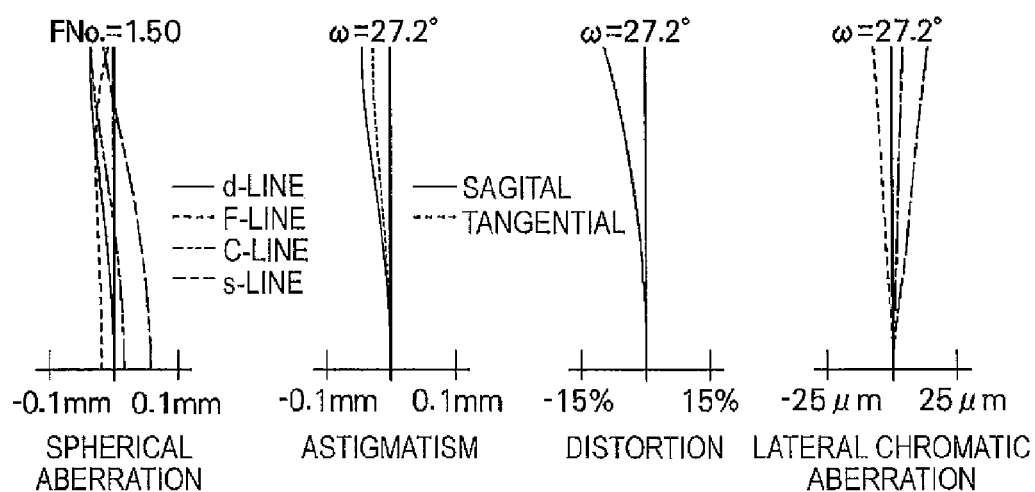
FIG. 19 EXAMPLE 6

EXAMPLE 7

EXAMPLE 8

EXAMPLE 9

EXAMPLE 10

EXAMPLE 11

EXAMPLE 12

IMAGING LENS AND IMAGING APPARATUS EQUIPPED WITH THE IMAGING LENS

This application is based on and claims priority under 35 U.S.C §119 from Japanese Patent Application No. 2007-132334, filed on May 18, 2007, the entire disclosure of which is herein incorporated by reference.

BACKGROUND OF THE INVENTION

1. Field of the Invention

The present invention relates to an imaging lens and an imaging apparatus equipped with the imaging lens, and relates more particularly to an imaging lens that is appropriate, for example, for mounting in an onboard camera, a portable terminal camera and a surveillance camera which employ an imaging device, such as a CCD (Charge Coupled Device) or a CMOS (Complementary Metal Oxide Semiconductor), and an imaging apparatus equipped with this imaging lens.

2. Description of Related Art

Recently, imaging devices such as CCD and CMOS have been very much downsized and improved in pixel density. Subsequently, the availability and use of more compact imaging devices have made possible great reductions in sizes of image apparatus main bodies, and this, in turn, has created a continuing demand for smaller, lighter imaging lens for smaller, lighter imaging apparatuses.

On the other hand, with respect to onboard camera and surveillance camera applications, there is a demand for compact, high-performance cameras that are highly resistant to the adverse effects of wide ranging, extreme weather variations, from bitterly cold winter weather in the open air to overheated summer automotive interiors in tropical areas. Furthermore, from the viewpoint of automotive use, the onboard cameras most in demand are those for which exposed lens portions are the smallest.

Imaging lenses in the related art are described, for example, in JP-A-55-45007 and JP-A-61-90115. The imaging lens disclosed in JP-A-55-45007 is a wide-angle retro-focus lens including six lenses, which is used for photography, and the imaging lens disclosed in JP-A-61-90115 is an objective lens for image formation, including five or six lenses, for which a wide range of chromatic aberration corrections has been performed.

However, the F values of the lens systems described in JP-A-55-45007 and JP-A-61-90115 are 3.5 and 3.76 to 4.5, respectively, which means dark optical systems. Since it is anticipated that onboard and surveillance cameras will be used at night, in that case, a bright optical system is required.

Furthermore, according to the imaging lenses described in JP-A-55-45007 and JP-A-61-90115, the back focal length ratios relative to the thicknesses of the lens systems in the optical axial direction (the length in the optical axial direction from the lens surface nearest to an object to the lens surface nearest to an image) are large, i.e., about 0.95 and 1 to 2, respectively. That is, the entire length for the optical systems in the related art, from the lens system to the imaging surface is long, and the recent demand for the downsizing of lens systems is not satisfied.

SUMMARY OF THE INVENTION

An object of an illustrative, non-limiting embodiment of the present invention is to provide a compact imaging lens, which performs a good optical performance and which has a small F value, and an imaging apparatus equipped with the imaging lens.

According to an aspect of the invention, there is provided an imaging lens including: in order from the object side:

a first lens group including a biconcave lens;

a second lens group including two lenses whose convex surfaces are arranged opposite to each other, the second lens group having a positive refractive power as a whole;

a third lens group including a biconcave lens; and a fourth lens group including two lenses whose convex surfaces are arranged opposite to each other, the fourth lens group having a positive refractive power as a whole, wherein a back focal length BF of the entire system (the imaging lens), a length L, in a optical axial direction from a surface of the entire system nearest to an object to a surface of the entire system nearest to an image, and a refractive index $N_4$ of the biconcave lens of the third lens group at the d-line, satisfy conditional expressions (1) and (2) below.

$$0.20 < BF/L < 0.44 \quad (1)$$

$$N_4 > 1.8 \quad (2)$$

In the imaging lens, each of the convex surfaces of the fourth lens group, which are arranged opposite to each other, may a radius of curvature whose absolute value is smaller than that of the other surface of each lens.

In the imaging lens, each of the convex surfaces of the second lens group, which are arranged opposite to each other, may have a radius of curvature whose absolute value is smaller than that of the other surface of each lens.

In the second lens group and the fourth lens group, there may be an air space between the convex surfaces arranged opposite to each other.

In the imaging lens, a focal length $f_1$ of the first lens group and a focal length f of the entire system may satisfy conditional expression (3).

$$0.97 < |f_1|/f < 1.92 \quad (3)$$

Further, in the imaging lens, a focal length $f_2$ of the second lens group and the focal length f of the entire system may satisfy conditional expression (4) below.

$$0.65 < |f_2|/f < 1.30 \quad (4)$$

Further, in the imaging lens, a focal length $f_3$ of the third lens group and the focal length f of the entire system may satisfy conditional expression (5) below.

$$0.49 < |f_3|/f < 1.03 \quad (5)$$

In addition, in the imaging lens, an Abbe number $v_4$ of the biconcave lens of the third lens group at the d-line may satisfy conditional expression (6) below.

$$v_4 < 30 \quad (6)$$

According to an aspect of the invention, there is provided an imaging apparatus including the imaging lens described above; and an imaging device for converting an optical image formed by the imaging lens into an electric signal.

The respective values represented by the conditional expressions (1) to (6) are based on the d-line (wavelength of 587.6 nm) as a reference wavelength. In this specification, the d-line is employed as a reference wavelength unless an explanatory note is especially provided.

BRIEF DESCRIPTION OF THE DRAWINGS

The features of the invention will appear more fully upon consideration of the exemplary embodiment of the invention, which are schematically set forth in the drawings, in which:

FIG. 14 is diagrams illustrating aberrations of an imaging lens according to Example 1 of the present invention;

FIG. 15 is diagrams illustrating aberrations of an imaging lens according to Example 2 of the present invention;

FIG. 16 is diagrams illustrating aberrations of an imaging lens according to Example 3 of the present invention;

FIG. 17 is diagrams illustrating aberrations of an imaging lens according to Example 4 of the present invention;

FIG. 18 is diagrams illustrating aberrations of an imaging lens according to Example 5 of the present invention;

FIG. 19 is diagrams illustrating aberrations of an imaging lens according to Example 6 of the present invention;

DETAILED DESCRIPTION OF THE EXEMPLARY EMBODIMENTS

In the imaging lens according to an exemplary embodiment of the invention, downsizing can be provided by satisfying the conditional expression (1), and when an appropriate material for the lens is selected so that the lens satisfies the conditional expression (2), and when the shapes of the individual lenses and the refractive power for the lens groups is property designated, a small F value and a good optical performance can be obtained. That is, according to an exemplary embodiment of the invention, a compact imaging lens which has a good optical performance and a small F value, and an imaging apparatus which is equipped with the imaging lens can be provided.

An imaging lens and an imaging apparatus equipped with this imaging lens will now be described detail according to exemplary embodiments of the present invention, referring to drawings. First, the imaging lens will be described, and thereafter, the imaging apparatus will be described.

Figure 1:
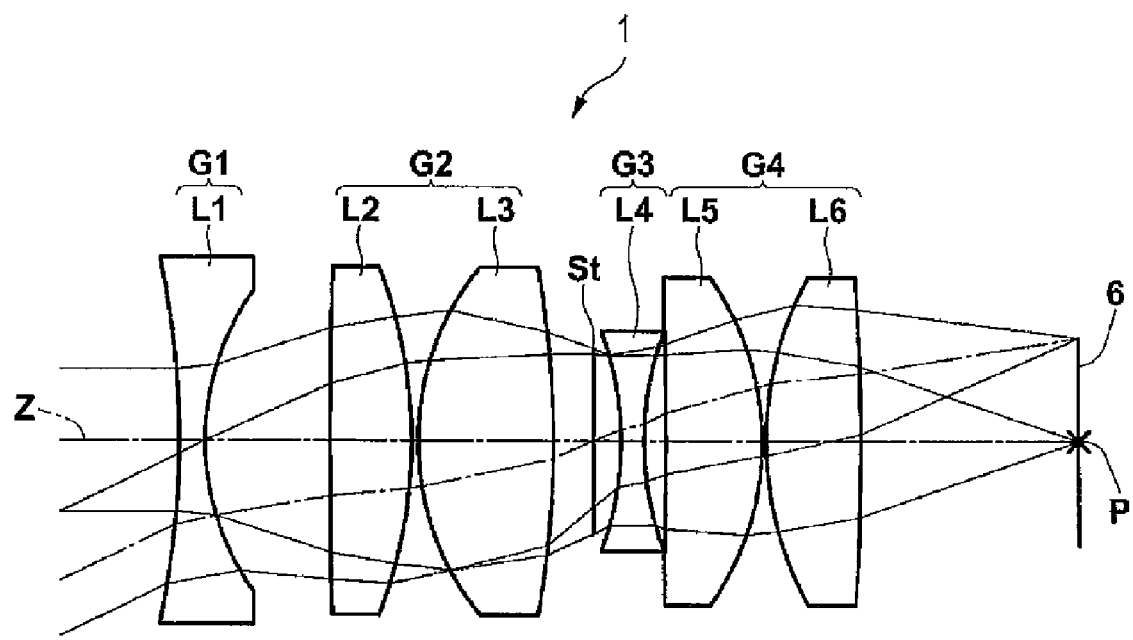
FIG. 1 is a diagram illustrating the optical path of an imaging lens according to an exemplary embodiment of the present invention.

FIG. 1 is a diagram illustrating the optical path for an imaging lens 1 according to an exemplary embodiment of the present invention. The optical-path diagram illustrated in FIG. 1 is a diagram in which an axial ray and an off-axial ray are additionally provided for the optical cross sectional view of imaging lens 1. An example structure in FIG. 1 corresponds to a lens arrangement for Example 1, which will be described later.

In the imaging lens 1, a first lens group G1, a second lens group G2, a third lens group G3 and a fourth lens group G4 are arranged in order from the object side along the optical axis Z. The first lens group G1 includes a biconcave lens L1, and the second lens group G2 includes two lenses L2 and L3 whose convex surfaces are arranged opposite to each other with an air space in between, and has as a whole a positive refractive power. The third lens group G3 includes a biconcave lens L4, and the fourth lens group G4 includes two lenses L5 and L6 whose convex surfaces are arranged opposite to each other with an air space in between, and has as a whole a positive refractive power.

In the imaging lens 1 in FIG. 1, an aperture diaphragm St is located between the second lens group G2 and the third lens group G3. However, as illustrated in numerical examples that will be described later, the position of the aperture diaphragm St in the imaging lens is not limited to that depicted in FIG. 1. The aperture diaphragm St in FIG. 1 merely represents a position, and does not indicate either shape or size.

Further, referring to FIG. 1, taking into account a case where the imaging lens 1 is applied to an imaging apparatus, an imaging device 6 is also arranged on a surface on which there is an imaging position P for the imaging lens 1. The imaging device 6 converts an optical image, formed by the imaging lens 1, into an electric signal, and can, for example, be a CCD image sensor. Generally, the imaging device 6 includes a cover glass (not shown), for protecting an imaging surface, and this imaging surface is the surface on which the imaging position P is located.

Although not shown in FIG. 1, when the imaging lens 1 is employed for an imaging apparatus, various filters, such as a low-pass filter or an infrared cut filter, can be additionally arranged between the imaging lens 1 and the imaging device 6, in accordance with the configuration of the imaging apparatus.

A detailed description will now be given of the structure of the imaging lens 1 and of the obtained operating effects. The imaging lens 1 is so designed that the refractive power of the entire system is positive and the refractive powers of the respective lens groups is negative, positive, negative and positive in order from the object side,. Since adjacent lens groups have refractive powers for which the signs are inverted, an aberration that may occur in a group can be offset by its adjacent group, so that all aberrations can be appropriately corrected.

In the first lens group G1, the lens L1 is made to have a biconcave shape, a satisfactorily strong refractive power can be obtained, despite the fact that a single lens is used. Therefore, this structure can contribute both to a reduction in the number of lenses used and to downsizing. As for the third lens group G3, since the lens L4 also has a biconcave shape, the same effects can be obtained as are provided by the lens L1.

Further, as is apparent from FIG. 1, the height of a light ray is lowered at both the lens L1 and the lens L4. In an imaging system such as the imaging lens 1, the system is designed so that an axial light ray having a short light ray height passes through the concave surface having a strong refractive power, and hence, the Petzval sum of the entire system can be reduced.

On the other hand, the light ray heights of the positive lenses L2, L3, L5 and L6 are increased, and a great change in the light ray height occurs between the negative lens group and the positive lens group. In order to reduce an aberration that occurs between the groups, surfaces of the positive lenses opposite to the negative lenses may be a surface which has the greater absolute value of a radius of curvature and is directed toward the image side, and the imaging lens 1 is so configured. That is, the lens of the second lens group G2 (corresponding to the lens L2), which is the positive lens group nearest to the object, is arranged so that a surface having the greater absolute value for a radius of curvature is directed toward the object side and the lens of the second lens group G2 (corresponding to the lens L3) nearest to an image is so arranged that the surface having the greater absolute value of a radius of curvature is directed toward the image side. As a result, the effect of an aberration that occurs can be reduced.

In order to obtain a good positive refractive power for the second lens group G2, which is a positive lens group, the surface that is not opposite to the negative lens group may have a smaller absolute value for a radius of curvature. Therefore, in the second lens group G2 of the imaging lens 1, the convex surfaces of the respective lenses, for which the absolute values of a radius of curvature are smaller than those of the other surfaces in the respective lenses, are arranged opposite to each other.

The surfaces of the fourth lens group G4, which is the positive lens group, are arranged in the same manner as are those for the second lens group G2. The lens (corresponding to the lens L6) of the fourth lens group G4 nearest to the image is not directed toward the negative lens group, but is directed toward the imaging position P. Since the light ray height is changed from high to low to focus the light flux from the lens L6 to the imaging position P, the same technical concept as mentioned above can be applied. Also, for the fourth lens group G4, the convex surfaces of the lenses, which has the smaller absolute values of the radius of curvature than that of the other surfaces in the each lens, are arranged opposite to each other.

Furthermore, in the imaging lens 1, a back focal length BF for the entire system, a length L, in the optical axial direction from the surface of the entire system nearest to an object to the surface nearest to an image, and a refractive index $N_4$ of the lens L4 of the third lens group G3 at the d-line satisfy the following conditional expressions (1) and (2) below.

$$0.20 < BF/L < 0.44 \tag{1}$$

$$N_4 > 1.8 \tag{2}$$

The conditional expression (1) defines a ratio of the back focal length to the length of the lens system in the optical axial direction. When the ratio exceeds the upper limit of the conditional expression (1), the back focal length is extended, and the size of the entire optical system is increased, so that downsizing the apparatus is difficult. When the ratio is less than the lower limit of the conditional expression (1), an appropriate length can not be obtained for the back focal length, and it is difficult to arrange various filters and a cover glass between the lens system and the imaging surface.

The conditional expression (2) defines the refractive power of the biconcave lens L4. The lens L4 is a negative lens located substantially in the middle of the lens system, between the second lens group G2 and the fourth lens group G4, which has a positive refractive power, and is an important lens for obtaining the optical performance. When the value is less than the lower limit for the conditional expression (2), the radius of curvature of the lens is reduced, and machining of the lens is difficult. In addition, the value of an aberration that occurs is increased, and a satisfactory optical performance is difficult to obtain.

In order to obtain the simplicity for machining and the improvement of the optical performance, the conditional expression (2-1) below may be satisfied.

$$N_4 > 1.88 \tag{2-1}$$

For further simplicity for machining and additional improvement of the optical performance, the conditional expression (2-2) below may be satisfied.

$$N_4 > 1.9 \tag{2-2}$$

Although the imaging lens 1 is formed of a small number of lenses as described above, an aberration can be appropriately corrected while a small F value is maintained, and downsizing can also be provided.

Further, in the imaging lens 1, a focal length fi of the first lens group G1 and a focal length f of the entire system may satisfy conditional expression (3).

$$0.97 < |f_1|/f < 1.9 \tag{3}$$

The conditional expression (3) defines the refractive power of the first lens group G1 relative to the entire system. When the ratio exceeds the upper limit of the conditional expression (3), the refractive power of the first lens group G1 is too low, a back focal length having an appropriate length can not be obtained, and it is difficult to arrange various filters and a cover glass between the lens system and the imaging surface. When the ratio is less than the lower limit for the conditional expression (3), the refractive power of the first lens group G1 becomes too strong, and the effect of distortion is increased.

Moreover, in the imaging lens 1, a focal length $f_2$ of the second lens group G2 and a focal length f of the entire system may satisfy conditional expression (4) below.

$$0.65 < |f_2|/f < 1.30 \tag{4}$$

The conditional expression (4) defines the refractive power of the second lens group G2, relative to the entire system. When the ratio exceeds the upper limit for the conditional expression (4), the refractive power of the second lens group G2 is too low, and a distortion or a field curvature is under-corrected. When the ratio is less than the lower limit of the conditional expression (4), the refractive power of the second lens G2 is too strong, and it is difficult to obtain a back focal length having a satisfactory length and the relative illumination.

Further, in the imaging lens 1, a focal length $f_3$ of the third lens group G3 and a focal length f of the entire system may satisfy conditional expression (5) below.

$$0.49 < |f_3|/f < 1.03 \tag{5}$$

The conditional expression (5) defines the refractive power of the third lens group G3 relative to the entire system. When the ratio exceeds the upper limit of the conditional expression (5), spherical and other aberrations are under-corrected, and it is difficult to provide a bright optical system having a small F value. When the ratio is less than the lower limit of the conditional expression (5), high-order aberrations become too strong, and spherical and other aberrations are over-corrected. Furthermore, it is difficult to provide a bright optical system having a small F value.

In the imaging lens 1, an Abbe number $v_4$ of the lens L4 of the third lens group L3 at the d-line may satisfy conditional expression (6) below.

$$v_4 < 30 \quad (6)$$

The conditional expression (6) defines the Abbe number of the biconcave lens L4. When the Abbe number exceeds the upper limit of the conditional expression (6), correction of a chromatic aberration is difficult.

Furthermore, in order to appropriately correct a chromatic aberration, the Abbe number $v_4$ of the lens L4 at the d-line may satisfy $$v_4 < 25 \quad (6\text{-}1).$$

In addition, in the imaging lens 1, the length L along the optical axis from the surface of the entire system nearest to the object to the surface nearest to the image, the back focal length BF of the entire system and the focal length f of the entire system may satisfy conditional expression (7) below.

$$3.08 < (L + BF)/f < 6.37 \quad (7)$$

The conditional expression (7) defines a ratio of the entire length of the optical system, extended from the lens system to the imaging surface, relative to the focal length. When the ratio exceeds the upper limit of the conditional expression (7), the length of the entire optical system is extended, the size of the entire optical system is increased, and downsizing is difficult. When the ratio is less than the lower limit of the conditional expression (7), a back focal length having an appropriate length can not be obtained, and it is difficult to arrange various filters and a cover glass between the lens system and the imaging surface.

Since the lens L1 is the lens nearest to the object, when the imaging lens is used in a severely adverse environment by being mounted on, for example, an onboard camera, the lens L1 may be made of a material whose surface is not likely to be deteriorated by wind and rain, and may be strong enough to resist the effects of temperature changes due to direct sunlight and of chemicals like oils and detergents, i.e., a material that is waterproof, weatherproof, acid resistant and chemical resistant. Further, preferably, a hard material, not easily cracked, should be employed for the lens L1, and glass or transparent ceramics, for example, may be employed. A ceramic material has a greater hardness and a higher heat resistance than has normal glass.

Furthermore, when an imaging lens 1 is to be mounted in an onboard camera, for example, the imaging lens 1 should function well within a wide temperature range, extending from open air winter temperatures in sub-zero areas to greatly elevated summer temperatures inside automobiles in tropical areas. Therefore, only glass lenses may be used, and specifically, the imaging lens 1 may be suitable for employment in temperatures ranging from −40° C. to 125° C. Further, to enable the manufacture of low cost imaging lenses, only spherical lenses may be used.

EXAMPLES

Next, specific numerical examples for the imaging lens 1 of the present invention will now be described.

Example 1

The specification values and the design specifications for an imaging lens according to an example 1 are shown in Table 1. In Table 1, surface numbers are provided in ascending order for i-th (i=1, 2, 3, . . . ) surfaces that are sequentially arranged in order from the surface of a component nearest to an object toward an image side. Ri indicates a radius of curvature for the i-th (i=1, 2, 3, . . . ) surface, and Di indicates on-axis surface spacing, along the optical axis Z, between the i-th (i=1, 2, 3, . . . ) surface and the (i+1)-th surface. Ndj indicates a refractive index at the d-line (wavelength 587.6 nm), of the j-th lens (j=1, 2, 3, . . . ), the surface number of which sequentially ascends from the lens nearest to the object as the first lens toward the image side. vdj indicates the Abbe number of the j-th lens at the d-line. A lens group correlated with the right-most column is denoted by a symbol. In Table 1, the unit "mm" is employed for a radius of curvature and the on-axis surface spacing, and when the radius of curvature is convex toward the object side, this is regarded as positive, while when the radius of curvature is convex toward the image side, this regarded as negative.

In Table 1, FNo. indicates an F value, ω indicates a half angle of view, IH indicates an image height, f indicates the focal length of the entire system, BF indicates a back focal length, and L indicates the length of the entire system along the optical axis Z, from the surface nearest to the object to the surface nearest to the image. These definitions for the symbols in Table 1 are applied for examples that will be described later.

Figure 2:
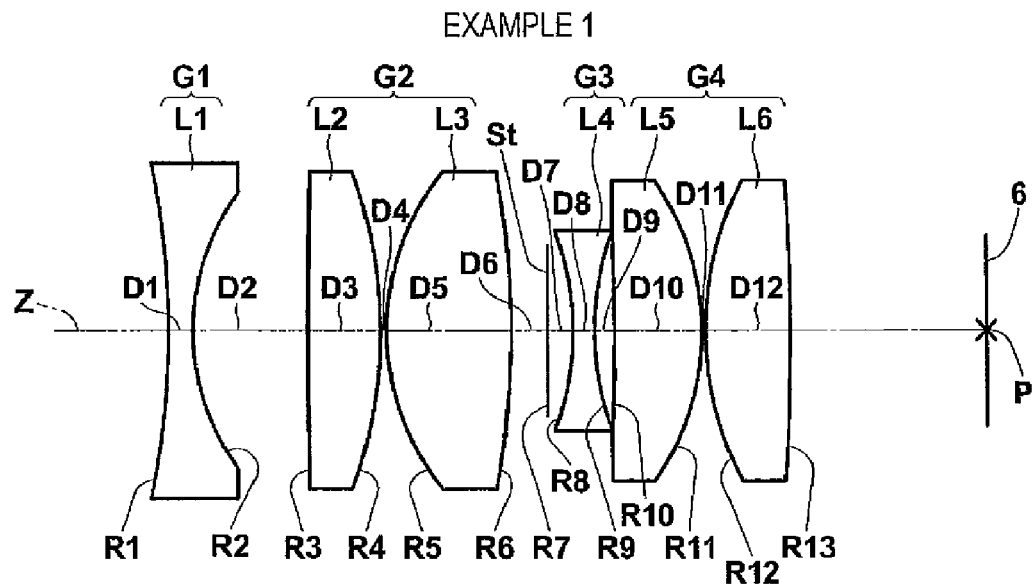
FIG. 2 is a cross-sectional view of an imaging lens according to Example 1 of the present invention.

The cross-sectional view of the lens structure of the example 1 is shown in FIG. 2. Symbols Ri (i=1, 2, 3, . . . ) and Di (i=1, 2, 3, . . . ) in FIG. 2 correspond to those in Table 1. It should be noted that an aperture diaphragm is also additionally denoted using a symbol St in Table 1 and FIG. 2, and that the aperture diaphragm St in FIG. 2 represents neither the shape nor the size, but merely represents the position along the optical axis Z. Further, in FIG. 2, an imaging position P is also illustrated, and the definitions for the symbols in FIG. 2 are also applied for the examples that will be described later.

TABLE 1

Example 1
FNo. = 1.50, ω = 27.3°, IH = 2.675, f = 5.72, BF = 5.51, L = 17.66

| Surface Number | Ri | Di | Ndj | vdj | Lens group |
|---|---|---|---|---|---|
| 1 | −22.8067 | 0.68 | 1.7725 | 49.6 | G1 |
| 2 | 6.6697 | 3.25 | | | |
| 3 | 194.6 | 2.09 | 1.801 | 35 | G2 |
| 4 | −12.6017 | 0.17 | | | |
| 5 | 7.0919 | 3.51 | 1.755 | 52.3 | |
| 6 | −25.1463 | 1.03 | | | |
| 7 (aperture diaphragm) | ∞ | 0.72 | | | |
| 8 | −8.0947 | 0.6 | 1.92286 | 18.9 | G3 |
| 9 | 8.0947 | 0.57 | | | |
| 10 | −87.9479 | 2.5 | 1.83481 | 42.7 | G4 |
| 11 | −7.3604 | 0.1 | | | |
| 12 | 8.9914 | 2.44 | 1.755 | 52.3 | |
| 13 | −61.5502 | | | | |

Example 2

Figure 3:
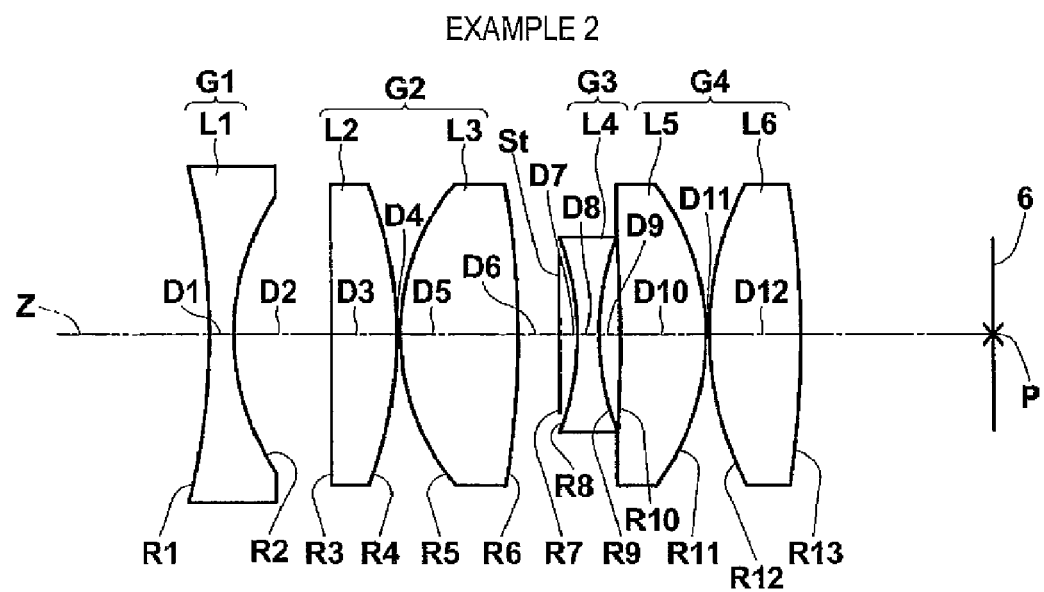
FIG. 3 is a cross-sectional view of an imaging lens according to Example 2 of the present invention.

Specification values for an imaging lens of an example 2 are shown in Table 2, and a cross-sectional view of the lens structure thereof is shown in FIG. 3. In FIG. 3, symbols Ri and Di correspond to Ri and Di in Table 2.

TABLE 2

Example 2
FNo. = 1.50, ω = 27.2°, IH = 2.675, f = 5.74, BF = 5.36, L = 16.73

| Surface Number | Ri | Di | Ndj | vdj | Lens group |
|---|---|---|---|---|---|
| 1 | −19.7663 | 0.67776 | 1.7725 | 49.6 | G1 |
| 2 | 6.9932 | 2.76106 | | | |
| 3 | ∞ | 1.87921 | 1.801 | 35 | G2 |
| 4 | −11.5477 | 0.1009 | | | |
| 5 | 6.6151 | 3.31055 | 1.755 | 52.3 | |
| 6 | −25.7487 | 1.1598 | | | |
| 7 (aperture diaphragm) | ∞ | 0.50965 | | | |
| 8 | −7.6738 | 0.60014 | 1.92286 | 18.9 | G3 |
| 9 | 7.6738 | 0.58827 | | | |
| 10 | −48.1189 | 2.4393 | 1.83481 | 42.7 | G4 |
| 11 | −7.1134 | 0.1 | | | |
| 12 | 9.1161 | 2.60791 | 1.755 | 52.3 | |
| 13 | −27.3505 | | | | |

Example 3

Figure 4:
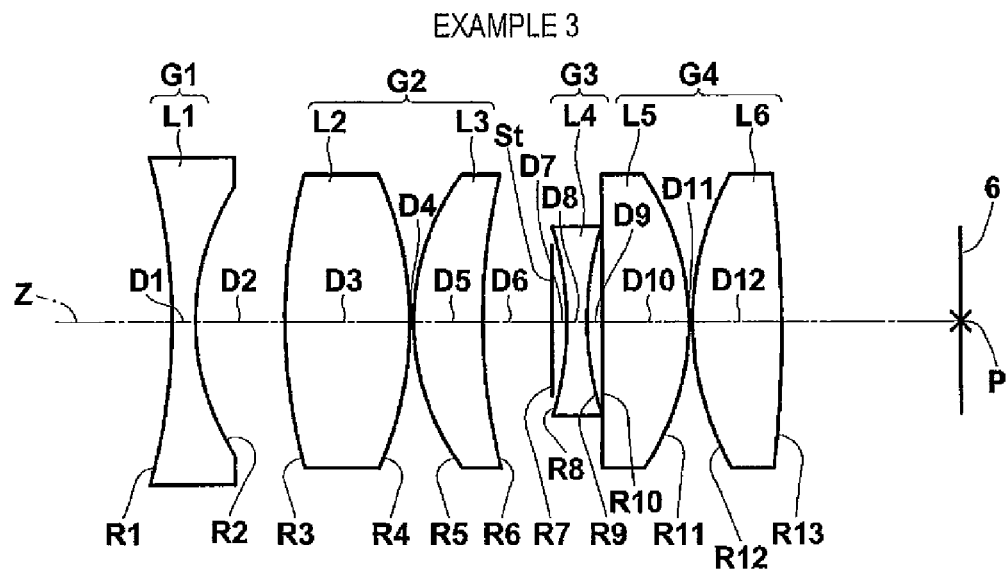
FIG. 4 is a cross-sectional view of an imaging lens according to Example 3 of the present invention.

Specification values for an imaging lens of an example 3 are shown in Table 3, and the cross-sectional view of the lens structure thereof is shown in FIG. 4. In FIG. 4, symbols Ri and Di correspond to Ri and Di in Table 3.

TABLE 3

Example 3
FNo. = 1.50, ω = 27.2°, IH = 2.675, f = 5.75, BF = 5.24, L = 17.70

| Surface Number | Ri | Di | Ndj | vdj | Lens group |
|---|---|---|---|---|---|
| 1 | −17.1056 | 0.67781 | 1.84016 | 42.7 | G1 |
| 2 | 7.1362 | 2.60612 | | | |
| 3 | 16.1261 | 3.60477 | 1.83285 | 44.6 | G2 |
| 4 | −10.4906 | 0.10641 | | | |
| 5 | 7.0738 | 2.01853 | 1.72679 | 55.1 | |
| 6 | 17.156 | 2.05918 | | | |
| 7 (aperture diaphragm) | ∞ | 0.43205 | | | |
| 8 | −8.9674 | 0.6 | 1.92286 | 18.9 | G3 |
| 9 | 8.9674 | 0.44244 | | | |
| 10 | −361.47 | 2.50568 | 1.84851 | 43.1 | G4 |
| 11 | −7.5521 | 0.1 | | | |
| 12 | 8.8441 | 2.55015 | 1.74074 | 5.39 | |
| 13 | −36.6385 | | | | |

Example 4

Figure 5:
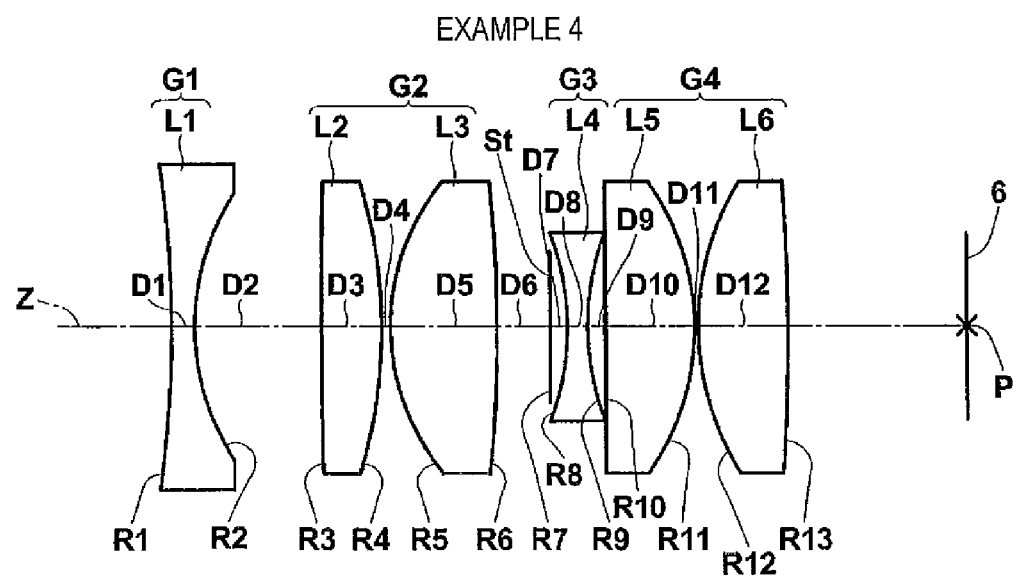
FIG. 5 is a cross-sectional view of an imaging lens according to Example 4 of the present invention.

Specification values for an imaging lens of an example 4 are shown in Table 4, and a cross-sectional view of the lens structure thereof is shown in FIG. 5. In FIG. 5, symbols Ri and Di correspond to Ri and Di in Table 4.

TABLE 4

Example 4
FNo. = 1.50, ω = 27.2°, IH = 2.675, f = 5.74, BF = 5.22, L = 17.96

| Surface Number | Ri | Di | Ndj | vdj | Lens group |
|---|---|---|---|---|---|
| 1 | −32.004 | 0.6778 | 1.7725 | 49.6 | G1 |
| 2 | 7.0336 | 3.71577 | | | |
| 3 | 167.3698 | 1.73127 | 1.801 | 35 | G2 |
| 4 | −14.7816 | 0.25329 | | | |
| 5 | 6.6514 | 3.1188 | 1.755 | 52.3 | |
| 6 | −42.5582 | 1.56177 | | | |
| 7 (aperture diaphragm) | ∞ | 0.51367 | | | |
| 8 | −7.6177 | 0.60001 | 1.92286 | 18.9 | G3 |
| 9 | 7.6177 | 0.51364 | | | |
| 10 | ∞ | 2.59001 | 1.83481 | 42.7 | G4 |
| 11 | −7.374 | 0.1 | | | |
| 12 | 8.1528 | 2.5803 | 1.755 | 52.3 | |
| 13 | −57.4927 | | | | |

Example 5

Figure 6:
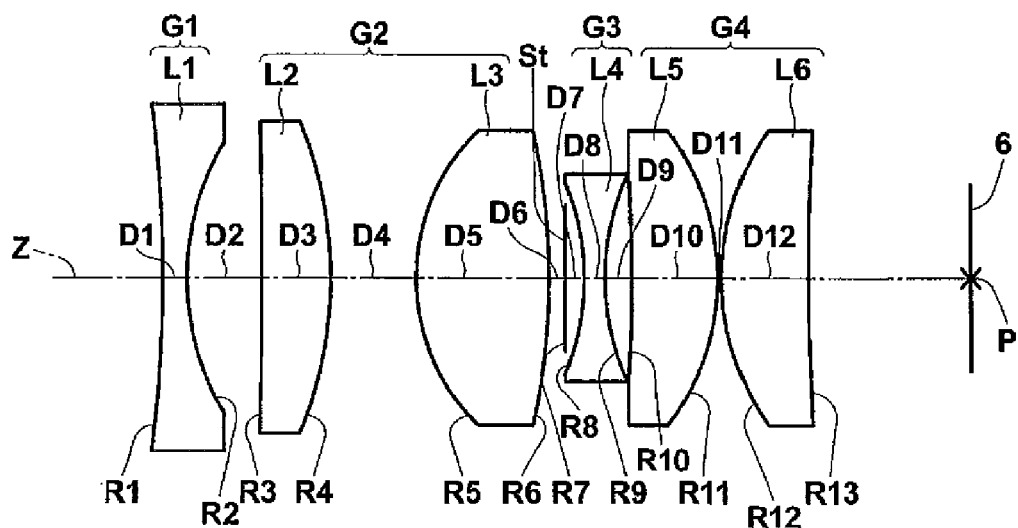
FIG. 6 is a cross-sectional view of an imaging lens according to Example 5 of the present invention.

Specification values for an imaging lens of an example 5 are shown in Table 5, and a cross-sectional view of the lens structure thereof is shown in FIG. 6. In FIG. 6, symbols Ri and Di correspond to Ri and Di in Table 5.

TABLE 5

Example 5
FNo. = 1.50, ω = 27.2°, IH = 2.675, f = 5.74, BF = 4.70, L = 18.66

| Surface Number | Ri | Di | Ndj | vdj | Lens group |
|---|---|---|---|---|---|
| 1 | −38.3127 | 0.69239 | 1.7725 | 49.6 | G1 |
| 2 | 7.6229 | 2.16278 | | | |
| 3 | −153.37 | 1.99148 | 1.80518 | 25.4 | G2 |
| 4 | −11.6022 | 2.47553 | | | |
| 5 | 5.8999 | 3.84864 | 1.713 | 53.9 | |
| 6 | −19.3771 | 0.4761 | | | |
| 7 (aperture diaphragm) | ∞ | 0.53241 | | | |
| 8 | −7.3684 | 0.60097 | 1.92286 | 18.9 | G3 |
| 9 | 7.0012 | 0.76968 | | | |
| 10 | −47.7122 | 2.50915 | 1.83481 | 42.7 | G4 |
| 11 | −6.9147 | 0.1 | | | |
| 12 | 7.2536 | 2.50396 | 1.83481 | 42.7 | |
| 13 | 76.0766 | | | | |

Example 6

Figure 7:
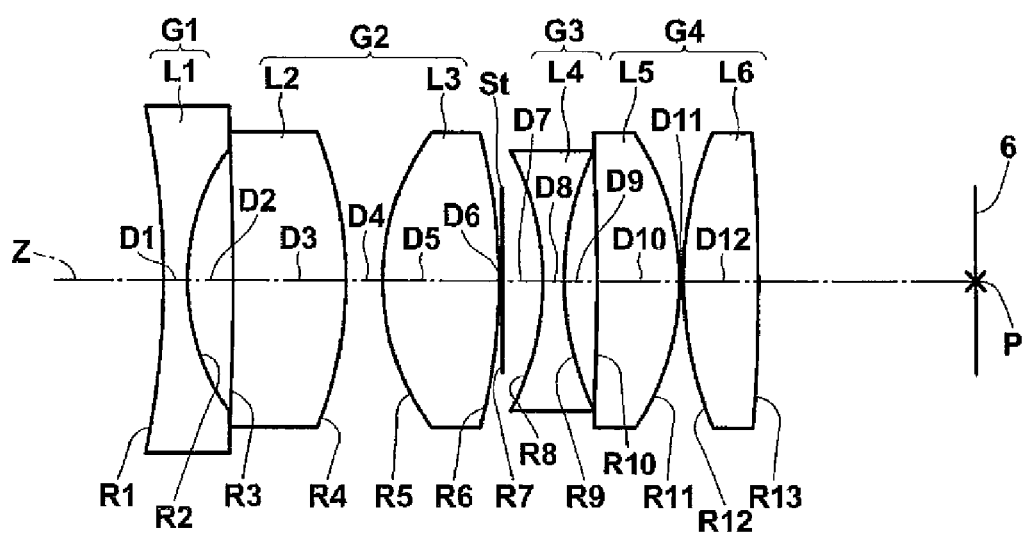
FIG. 7 is a cross-sectional view of an imaging lens according to Example 6 of the present invention.

Specification values for an imaging lens of an example 6 are shown in Table 6, and a cross-sectional view of the lens structure thereof is shown in FIG. 7. In FIG. 7, symbols Ri and Di correspond to Ri and Di in Table 6.

TABLE 6

Example 6
FNo. = 1.50, ω = 27.2°, IH = 2.675, f = 5.74, BF = 6.23, L = 17.14

| Surface Number | Ri | Di | Ndj | vdj | Lens group |
|---|---|---|---|---|---|
| 1 | −24.0957 | 0.69235 | 1.7725 | 49.6 | G1 |
| 2 | 6.5987 | 1.30689 | | | |
| 3 | −87.8023 | 3.25557 | 1.80518 | 25.4 | G2 |
| 4 | −11.278 | 1.07704 | | | |
| 5 | 7.1058 | 3.35569 | 1.7725 | 49.6 | |
| 6 | −16.9837 | 0.1003 | | | |
| 7 (aperture diaphragm) | ∞ | 1.14662 | | | |
| 8 | −8.0805 | 0.61933 | 1.92286 | 18.9 | G3 |
| 9 | 8.7376 | 0.92867 | | | |
| 10 | −84.6382 | 2.38619 | 1.83481 | 42.7 | G4 |
| 11 | −7.6128 | 0.10001 | | | |
| 12 | 10.9176 | 2.16756 | 1.83481 | 42.7 | |
| 13 | −50.7634 | | | | |

Example 7

Figure 8:
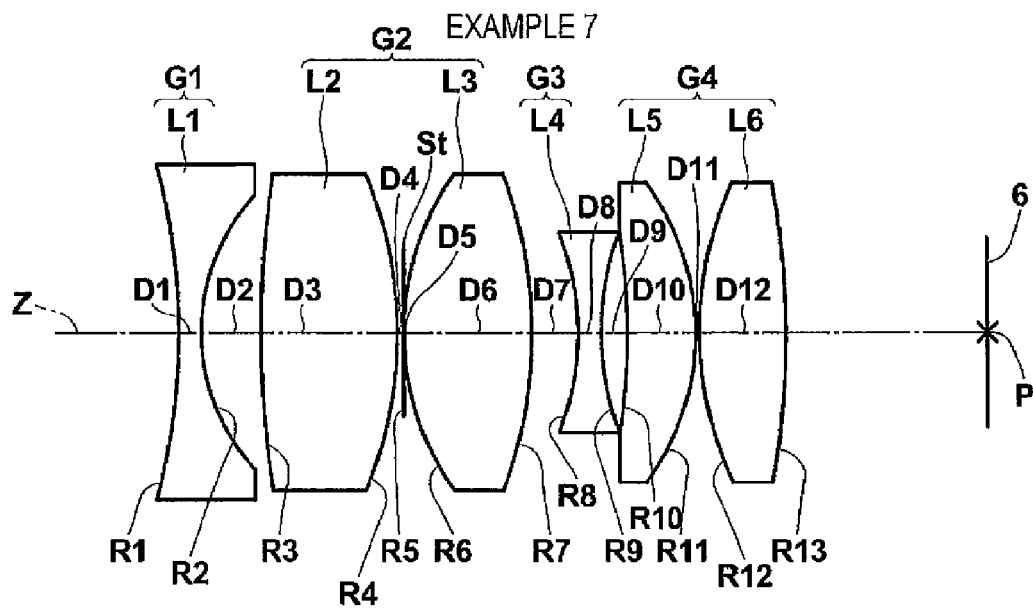
FIG. 8 is a cross-sectional view of an imaging lens according to Example 7 of the present invention.

Specification values for an imaging lens of an example 7 are shown in Table 7, and a cross-sectional view of the lens structure thereof is shown in FIG. 8. In FIG. 8, symbols Ri and Di correspond to Ri and Di in Table 7.

TABLE 7

Example 7
FNo. = 2.00, ω = 27.3°, IH = 2.675, f = 5.72, BF = 5.74, L = 17.31

| Surface Number | Ri | Di | Ndj | vdj | Lens group |
|---|---|---|---|---|---|
| 1 | −18.3554 | 0.64931 | 1.7725 | 49.6 | G1 |
| 2 | 5.719 | 1.70493 | | | |
| 3 | 28.7135 | 3.89585 | 1.801 | 35 | G2 |
| 4 | −11.6287 | 0.16985 | | | |
| 5 (aperture diaphragm) | ∞ | 0 | | | |
| 6 | 7.7658 | 3.62302 | 1.755 | 52.3 | |
| 7 | −12.8605 | 1.33389 | | | |
| 8 | −7.6813 | 0.66463 | 1.92286 | 18.9 | G3 |
| 9 | 8.0697 | 0.75476 | | | |
| 10 | −17.3973 | 1.98121 | 1.83481 | 42.7 | G4 |
| 11 | −6.9902 | 0.10087 | | | |
| 12 | 10.2018 | 2.42882 | 1.804 | 46.6 | |
| 13 | −24.0046 | | | | |

Example 8

Figure 9:
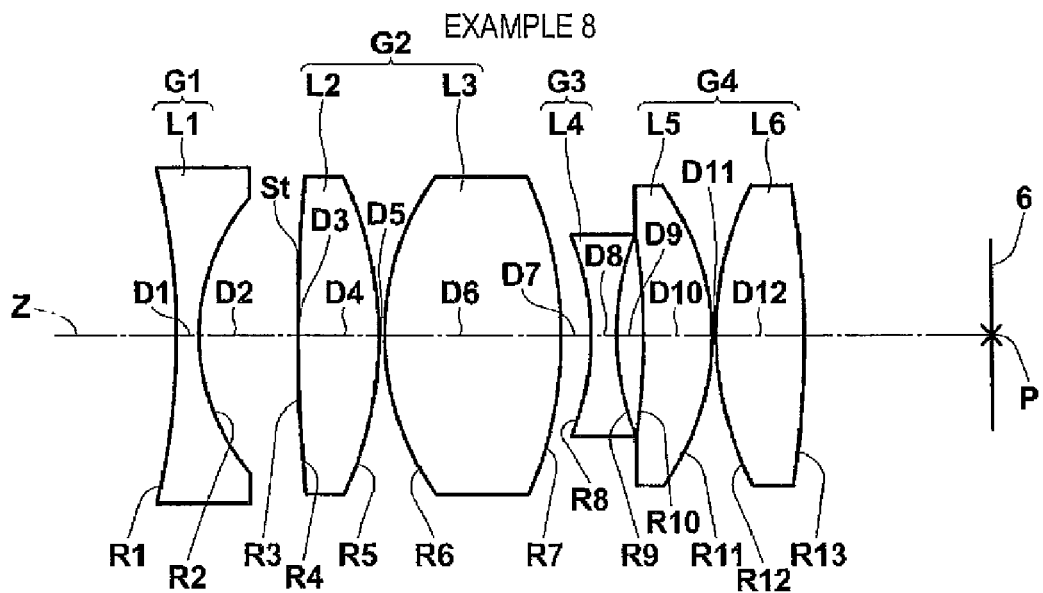
FIG. 9 is a cross-sectional view of an imaging lens according to Example 8 of the present invention.

Specification values for an imaging lens of an example 8 are shown in Table 8, and a cross-sectional view of the lens structure thereof is shown in FIG. 9. In FIG. 9, symbols Ri and Di correspond to Ri and Di in Table 8.

TABLE 8

Example 8
FNo. = 2.00, ω = 27.3°, IH = 2.675, f = 5.72, BF = 5.31, L = 17.78

| Surface Number | Ri | Di | Ndj | vdj | Lens group |
|---|---|---|---|---|---|
| 1 | −20.1898 | 0.64929 | 1.7725 | 49.6 | G1 |
| 2 | 6.0042 | 2.83898 | | | |
| 3 (aperture diaphragm) | ∞ | 0 | | | |
| 4 | 49.2587 | 2.27253 | 1.801 | 35 | G2 |
| 5 | −10.7722 | 0.16364 | | | |
| 6 | 7.6889 | 4.99743 | 1.755 | 52.3 | |
| 7 | −11.0276 | 0.84258 | | | |
| 8 | −7.3298 | 0.72074 | 1.92286 | 18.9 | G3 |
| 9 | 7.5457 | 0.78085 | | | |
| 10 | −18.4074 | 1.95853 | 1.83481 | 42.7 | G4 |
| 11 | −7.1618 | 0.10516 | | | |
| 12 | 9.4599 | 2.45008 | 1.788 | 47.4 | |
| 13 | −29.1004 | | | | |

Example 9

Figure 10:
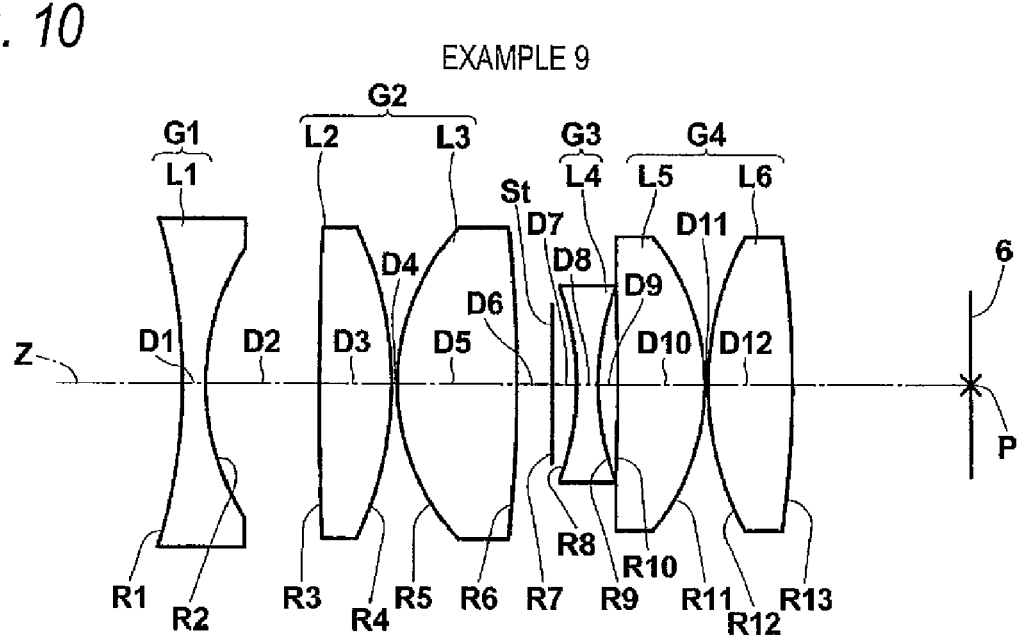
FIG. 10 is a cross-sectional view of an imaging lens according to Example 9 of the present invention.

Specification values for an imaging lens of an example 9 are shown in Table 9, and a cross-sectional view of the lens structure thereof is shown in FIG. 10. In FIG. 10, symbols Ri and Di correspond to Ri and Di in Table 9.

TABLE 9

Example 9
FNo. = 2.00, ω = 27.3°, IH = 2.675, f = 5.72, BF = 5.18, L = 17.66

| Surface Number | Ri | Di | Ndj | vdj | Lens group |
|---|---|---|---|---|---|
| 1 | −15.8322 | 0.68 | 1.835 | 42.7 | G1 |
| 2 | 7.3822 | 3.25 | | | |
| 3 | 125.1573 | 2.09 | 1.835 | 42.7 | G2 |
| 4 | −10.5395 | 0.17 | | | |
| 5 | 6.5127 | 3.51 | 1.773 | 49.6 | |
| 6 | −41.8796 | 1.03 | | | |
| 7 (aperture diaphragm) | ∞ | 0.72 | | | |
| 8 | −8.0951 | 0.6 | 2.144 | 17.8 | G3 |
| 9 | 8.0951 | 0.57 | | | |
| 10 | −78.036 | 2.5 | 1.834 | 37.2 | G4 |
| 11 | −6.7242 | 0.1 | | | |
| 12 | 9.1594 | 2.44 | 1.755 | 52.3 | |
| 13 | −33.119 | | | | |

Example 10

Figure 11:
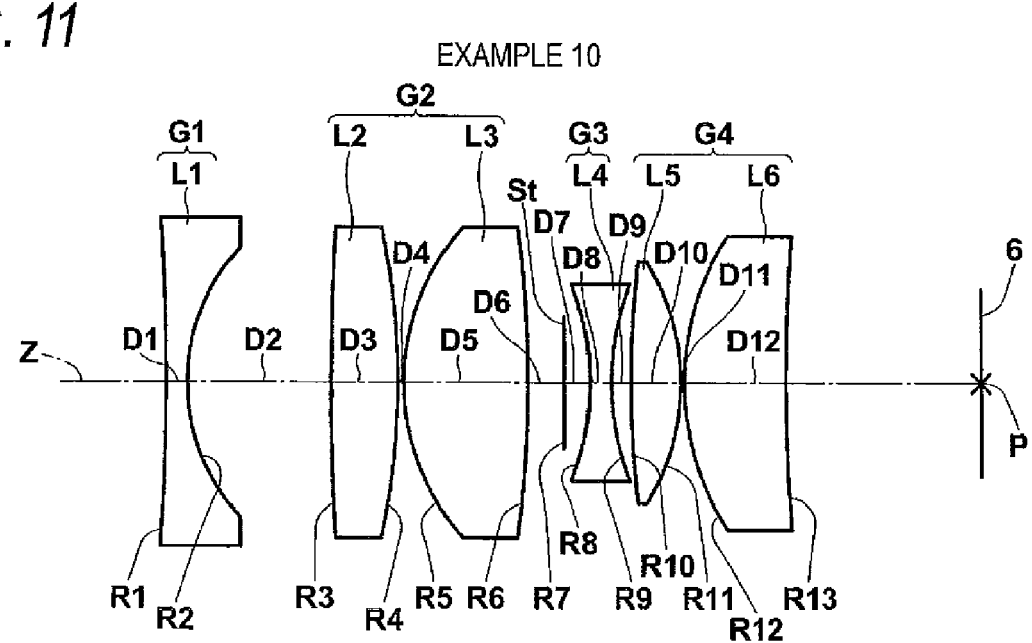
FIG. 11 is a cross-sectional view of an imaging lens according to Example 10 of the present invention.

Specification values for an imaging lens of an example 10 are shown in Table 10, and a cross-sectional view of the lens structure thereof is shown in FIG. 11. In FIG. 11, symbols Ri and Di correspond to Ri and Di in Table 10.

TABLE 10

Example 10
FNo. = 2.00, ω = 27.3°, IH = 2.675, f = 5.72, BF = 5.62, L = 17.95

| Surface Number | Ri | Di | Ndj | vdj | Lens group |
|---|---|---|---|---|---|
| 1 | −74.1533 | 0.63201 | 1.7725 | 49.6 | G1 |
| 2 | 5.7227 | 4.11305 | | | |
| 3 | 75.6884 | 1.93859 | 1.801 | 35 | G2 |
| 4 | −21.081 | 0.17031 | | | |
| 5 | 6.6432 | 3.6348 | 1.755 | 52.3 | |
| 6 | −33.5285 | 1.06284 | | | |
| 7 (aperture diaphragm) | ∞ | 0.74112 | | | |
| 8 | −7.7989 | 0.6102 | 2.0017 | 20.6 | G3 |
| 9 | 7.7989 | 0.57785 | | | |
| 10 | 31.2759 | 1.40512 | 1.83481 | 42.7 | G4 |
| 11 | −6.8593 | 0.1 | | | |
| 12 | 7.8183 | 2.95932 | 1.755 | 52.3 | |
| 13 | 53.1785 | | | | |

Example 11

Figure 12:
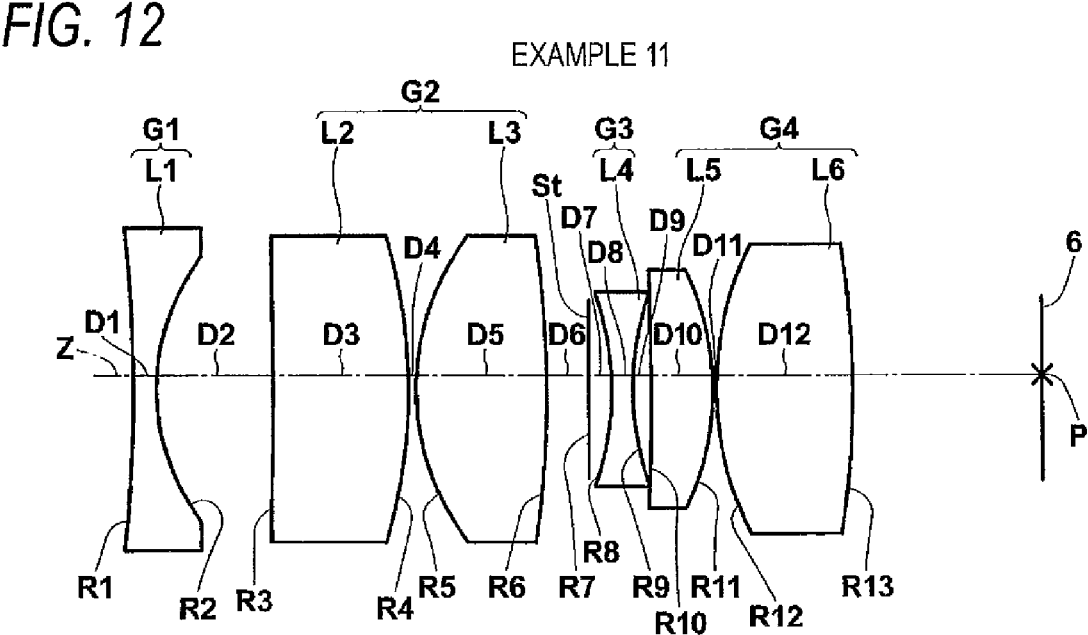
FIG. 12 is a cross-sectional view of an imaging lens according to Example 11 of the present invention.

Specification values for an imaging lens of an example 11 are shown in Table 11, and a cross-sectional view of the lens structure thereof is shown in FIG. 12. In FIG. 12, symbols Ri and Di correspond to Ri and Di in Table 11.

TABLE 11

Example 11
FNo. = 1.50, ω = 27.3°, IH = 2.675, f = 5.72, BF = 5.60, L = 21.19

| Surface Number | Ri | Di | Ndj | vdj | Lens group |
|---|---|---|---|---|---|
| 1 | −45.5 | 0.68491 | 1.7725 | 49.6 | G1 |
| 2 | 6.5206 | 3.40389 | | | |
| 3 | −145.334 | 3.99782 | 1.801 | 35 | G2 |
| 4 | −15.6675 | 0.23525 | | | |
| 5 | 7.3609 | 3.84567 | 1.755 | 52.3 | |
| 6 | −31.7047 | 1.22809 | | | |
| 7 (aperture diaphragm) | ∞ | 0.69968 | | | |
| 8 | −8.4042 | 0.61207 | 1.9068 | 21.2 | G3 |
| 9 | 8.4042 | 0.53848 | | | |

TABLE 11-continued

Example 11
FNo. = 1.50, ω = 27.3°, IH = 2.675, f = 5.72, BF = 5.60, L = 21.19

| Surface Number | Ri | Di | Ndj | vdj | Lens group |
|---|---|---|---|---|---|
| 10 | −100.111 | 1.84841 | 1.83481 | 42.7 | G4 |
| 11 | −7.9919 | 0.1 | | | |
| 12 | 9.2682 | 3.99955 | 1.755 | 52.3 | |
| 13 | −27.5287 | | | | |

Example 12

Figure 13:
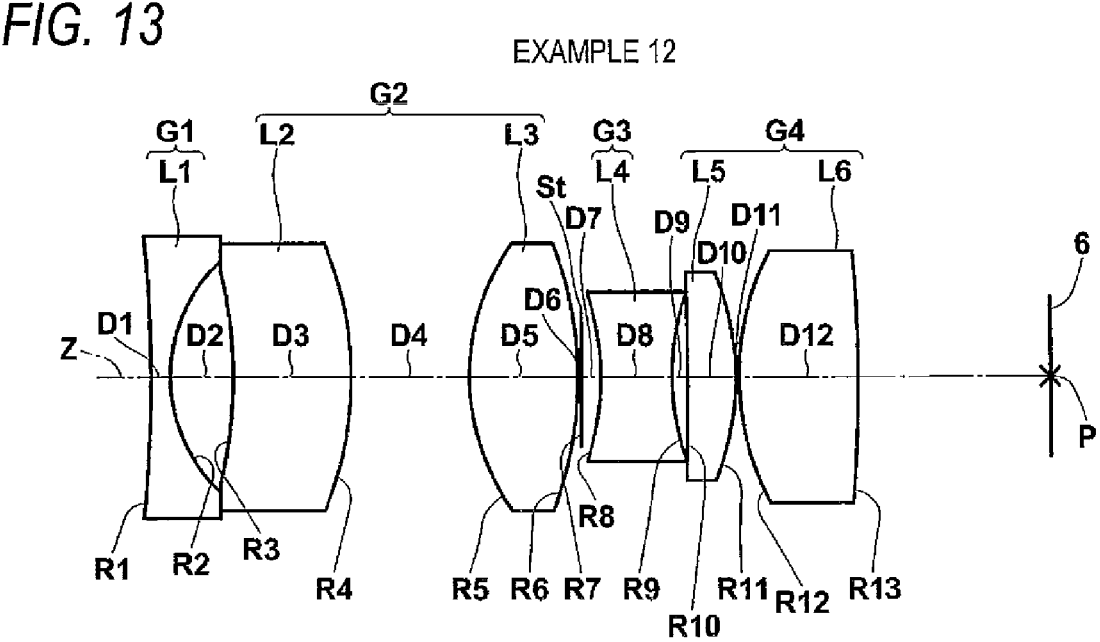
FIG. 13 is a cross-sectional view of an imaging lens according to Example 12 of the present invention.
Figure 20:
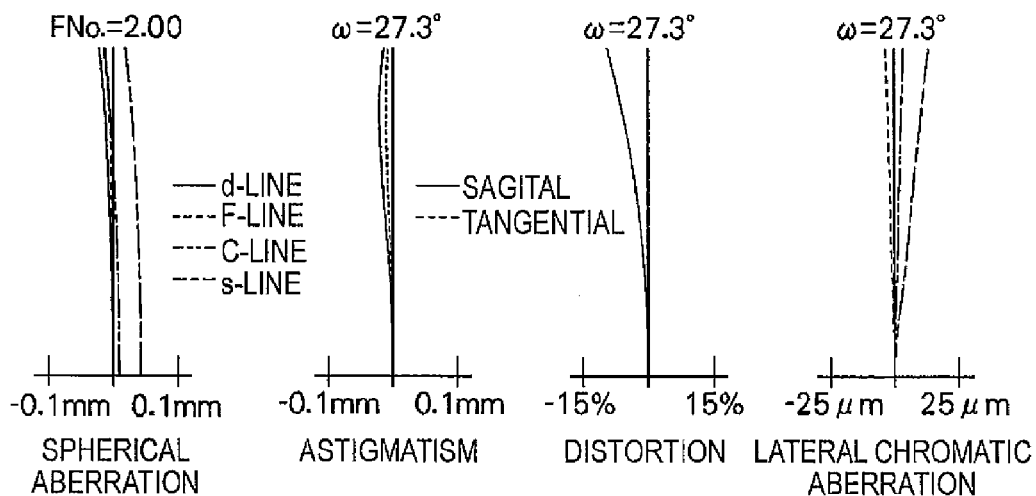
FIG. 20 is diagrams illustrating aberrations of an imaging lens according to Example 7 of the present invention.
Figure 21:
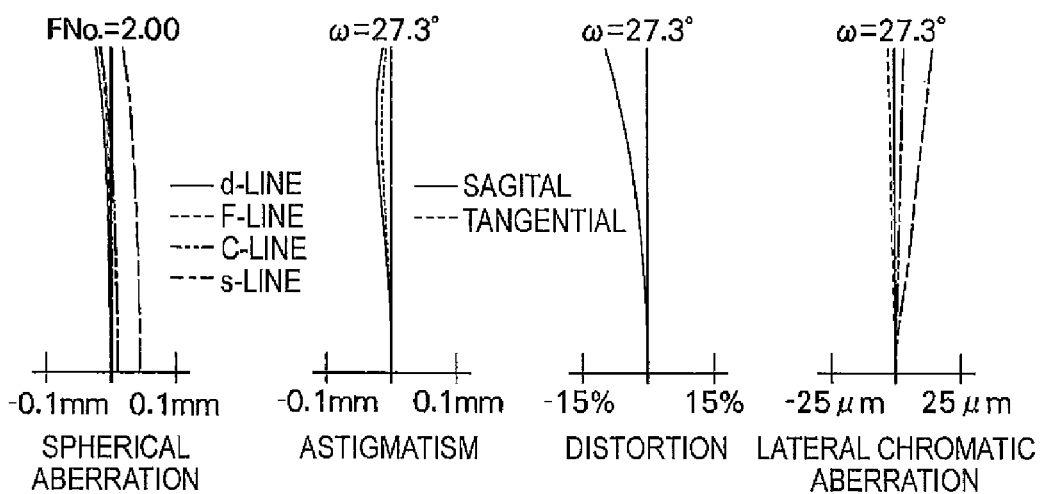
FIG. 21 is diagrams illustrating aberrations of an imaging lens according to Example 8 of the present invention.
Figure 22:
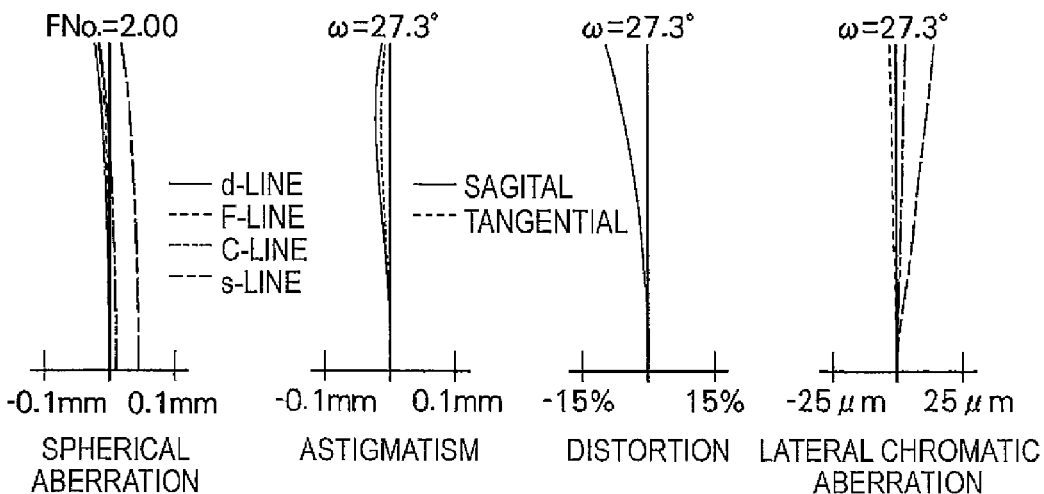
FIG. 22 is diagrams illustrating aberrations of an imaging lens according to Example 9 of the present invention.
Figure 23:
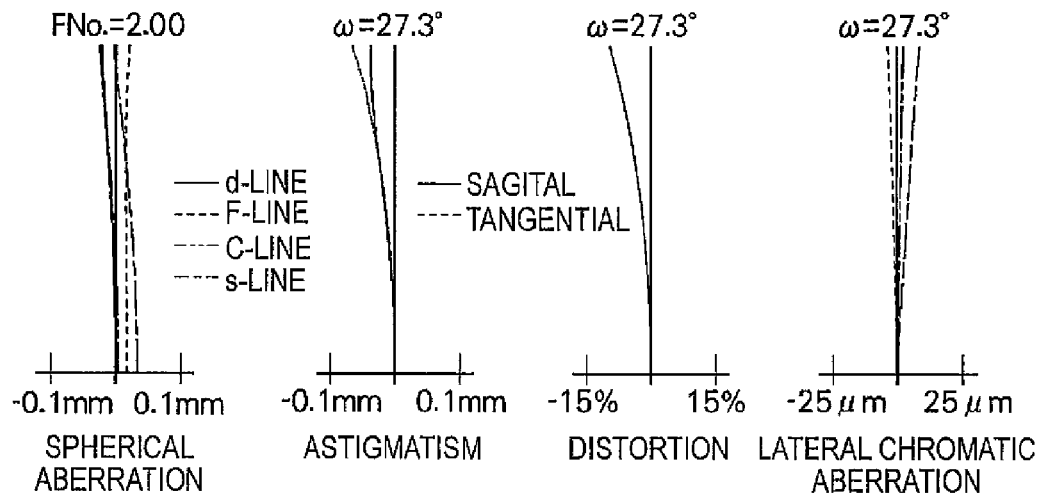
FIG. 23 is diagrams illustrating aberrations of an imaging lens according to Example 10 of the present invention.
Figure 24:
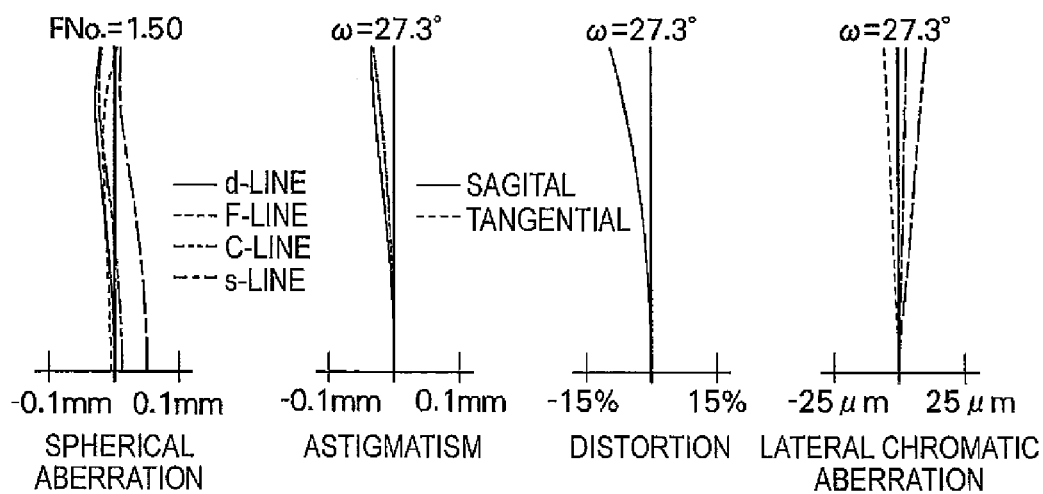
FIG. 24 is diagrams illustrating aberrations of an imaging lens according to Example 11 of the present invention.
Figure 25:
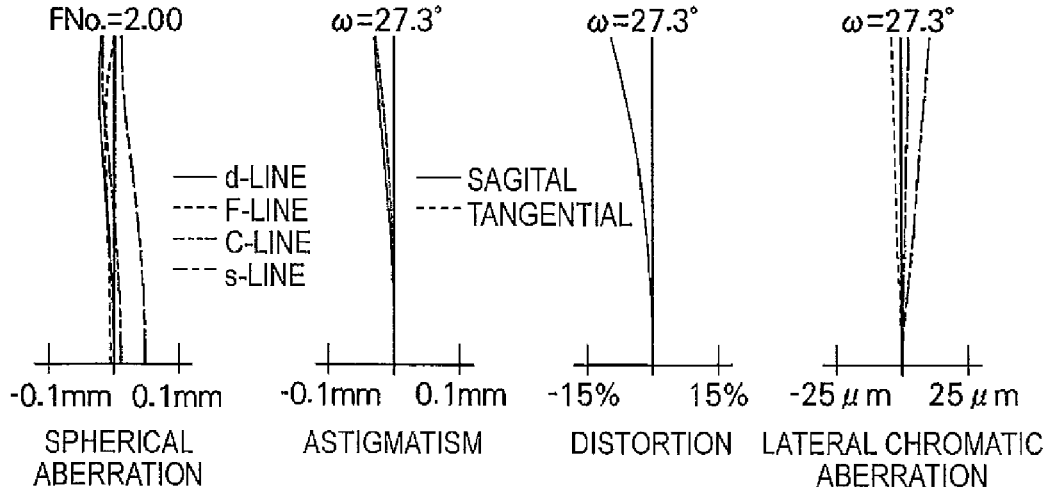
FIG. 25 is diagrams illustrating aberrations of an imaging lens according to Example 12 of the present invention.

Specification values for an imaging lens of an example 12 are shown in Table 12, and a cross-sectional view of the lens structure thereof is shown in FIG. 13. In FIG. 13, symbols Ri and Di correspond to Ri and Di in Table 12.

TABLE 12

Example 12
FNo. = 2.00, ω = 27.3°, IH = 2.675, f = 5.72, BF = 6.46, L = 23.89

| Surface Number | Ri | Di | Ndj | vdj | Lens group |
|---|---|---|---|---|---|
| 1 | −45.5 | 0.64934 | 1.5168 | 64.2 | G1 |
| 2 | 5.315 | 2.1325 | | | |
| 3 | −15.3375 | 3.99934 | 1.80518 | 25.4 | G2 |
| 4 | −11.5509 | 3.9993 | | | |
| 5 | 7.744 | 3.63714 | 1.713 | 53.9 | |
| 6 | −12.7625 | 0.1 | | | |
| 7 (aperture diaphragm) | ∞ | 0.70057 | | | |
| 8 | −8.3902 | 2.39743 | 1.80518 | 25.4 | G3 |
| 9 | 8.3902 | 0.52737 | | | |
| 10 | −142.207 | 1.65159 | 1.713 | 53.9 | G4 |
| 11 | −8.9239 | 0.10022 | | | |
| 12 | 9.1305 | 3.99965 | 1.713 | 53.9 | |
| 13 | −46.9713 | | | | |

Values corresponding to the conditional expressions (1) to (7) for the imaging lenses of the examples 1 to 12 are shown in Table 13. As is apparent from Table 13, all of the imaging lenses in the examples 1 to 12 satisfy the conditional expressions (1) to (7), and further, the imaging lenses in the examples 1 to 11 satisfy the conditional expressions (2-1), (2-2) and (6-1).

length. Further, for a spherical aberration and a lateral chromatic aberration, the F-line (wavelength 486.1 nm), the C-line (wavelength 656.3 nm) and the s-line (wavelength 852.1 nm) are also employed as references. An FNo., along the vertical axes in spherical aberration diagrams, represents an F value, and a "ω", along the vertical axes in other aberration diagrams, represents a half angle of view.

As is apparent from FIGS. 14 to 25, according to the examples 1 to 12, aberrations are properly corrected for the d-line, the F-line, the C-line and the s-line, i.e., within a wide range, from visible light areas to infrared light areas. Since the optical systems for the examples 1 to 12 have a small F value of 1.5 to 2 and exhibit a satisfactory optical performance, these systems are especially appropriate for use at nighttime.

The imaging lens 1 described above and the imaging lenses in the examples 1 to 12 can be employed for onboard cameras to obtain pictures to the front, side and rear of an automotive.

Figure 26:
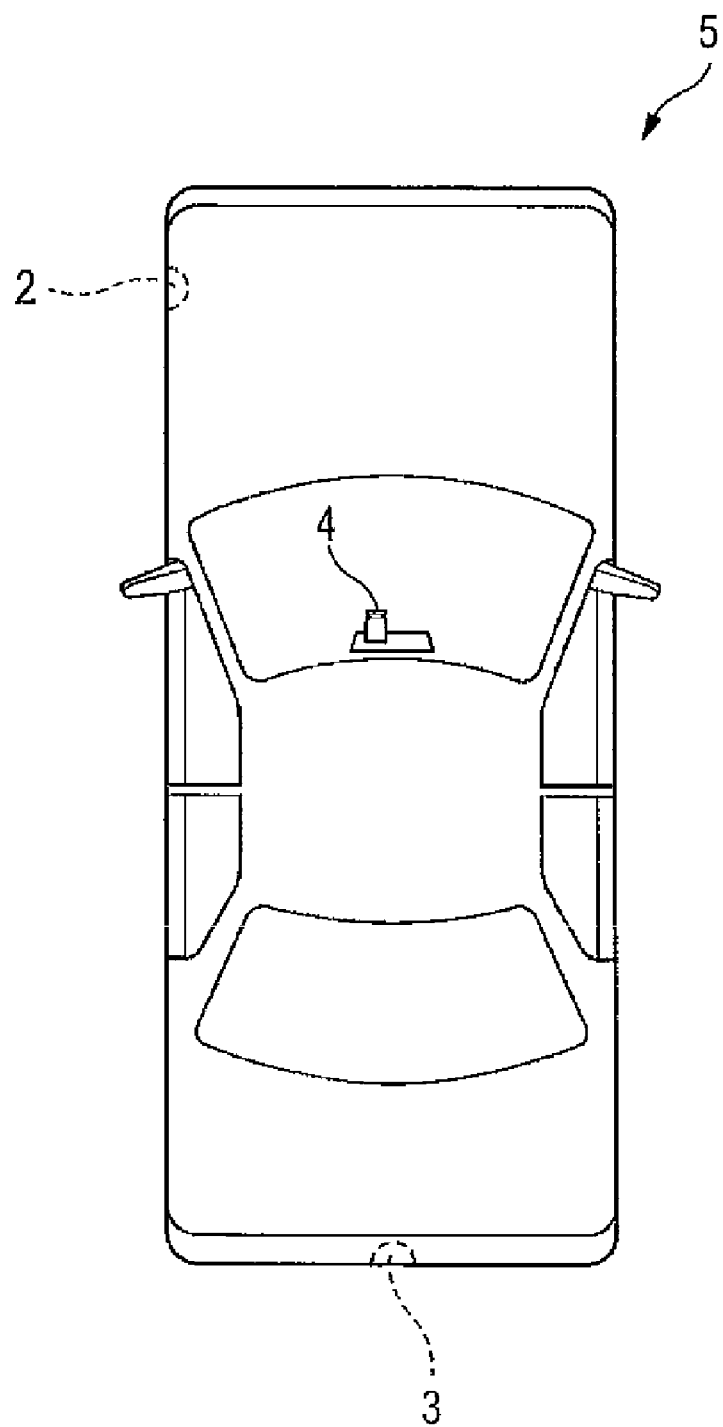
FIG. 26 is a diagram for explaining the location of the on-board imaging apparatus according to an exemplary embodiment of the present invention.

FIG. 26 is a diagram illustrating an example wherein imaging apparatuses, outfitted with the imaging lens of this embodiment, are mounted on an automobile 5. In FIG. 26, the automobile 5 is equipped with an externally mounted camera 2, for filming a blind spot on the passenger seat side; an externally mounted camera 3, for filming a blind spot at the rear of the automobile 5; and an internally mounted camera 4, secured to the reverse side of a rear-view mirror, for filming an area that corresponds to the visual field of a driver. The externally mounted cameras 2 and 3 and the internally mounted camera 4 are imaging apparatuses, each of which comprises the imaging lens 1 of this embodiment and an imaging device 6 that converts an optical image, formed by the imaging lens 1, into electric signals.

As described above, the imaging lens 1 according to this embodiment is a small, bright optical system having an appropriate optical performance, and the externally mounted cameras 2 and 3 and the internally mounted camera 4 can also be compactly constructed. With this system, a clear image can be formed on the imaging surface of the imaging device 6.

The present invention has been described by employing the embodiment and the numerical examples. However, the present invention is not limited to the embodiment and the numerical examples, and can be variously modified. For example, the radiuses of curvatures for the individual lens elements and the values for the on-axis surface spacing and

TABLE 13

| | Conditional expression (1) BF/L | Conditional expression (2) $N_4$ | Conditional expression (3) $|f_1|/f$ | Conditional expression (4) $|f_2|/f$ | Conditional expression (5) $|f_3|/f$ | Conditional expression (6) $v_4$ | Conditional expression (7) (L + BF)/f |
|---|---|---|---|---|---|---|---|
| Example 1 | 0.312 | 1.92286 | 1.156 | 0.914 | 0.753 | 18.9 | 4.051 |
| Example 2 | 0.320 | 1.92286 | 1.151 | 0.863 | 0.710 | 18.9 | 3.847 |
| Example 3 | 0.296 | 1.92286 | 1.030 | 0.931 | 0.832 | 18.9 | 3.993 |
| Example 4 | 0.291 | 1.92286 | 1.291 | 0.957 | 0.706 | 18.9 | 4.038 |
| Example 5 | 0.252 | 1.92286 | 1.425 | 0.946 | 0.665 | 18.9 | 4.071 |
| Example 6 | 0.363 | 1.92286 | 1.157 | 0.892 | 0.779 | 18.9 | 4.071 |
| Example 7 | 0.332 | 1.92286 | 0.976 | 0.815 | 0.731 | 18.9 | 4.032 |
| Example 8 | 0.299 | 1.92286 | 1.037 | 0.817 | 0.689 | 18.9 | 4.040 |
| Example 9 | 0.293 | 2.144 | 1.041 | 0.825 | 0.607 | 17.8 | 3.995 |
| Example 10 | 0.313 | 2.0017 | 1.197 | 1.003 | 0.667 | 20.6 | 4.117 |
| Example 11 | 0.264 | 1.9068 | 1.284 | 1.060 | 0.797 | 21.2 | 4.687 |
| Example 12 | 0.270 | 1.80518 | 1.604 | 1.084 | 0.857 | 25.4 | 5.310 |

FIGS. 14 to 25 are diagrams showing a spherical aberration, an astigmatism, a distortion and a lateral chromatic aberration of the respective imaging lenses of the examples 1 to 12. For the respective aberration diagrams, the d-line (wavelength 587.6 nm) is employed as a reference wavethe refractive indexes are not limited to those indicated in the numerical examples, other values can be employed.

Furthermore, an example wherein the present invention is employed for an onboard camera has been described as the embodiment for the imaging apparatus. However, the present invention is not limited to this application, and can also be applied, for example, for a portable terminal camera or a surveillance camera.

What is claimed is:

1. An imaging lens comprising: in order from an object side of the imaging lens, a first lens group including a biconcave lens;
a second lens group including two lenses whose convex surfaces are arranged opposite to each other, the second lens group having a positive refractive power as a whole;
a third lens group including a biconcave lens; and
a fourth lens group including two lenses whose convex surfaces are arranged opposite to each other, the fourth lens group having positive refractive power, as a whole, the imaging lens satisfying conditional expressions (1) and (2):

$$0.20 < BF/L < 0.44 \quad (1)$$

$$N_4 > 1.8 \quad (2)$$

wherein BF represents a back focal length BF of the imaging lens, L represents a length L in a optical axial direction from a surface of the imaging lens nearest to an object to a surface of the imaging lens nearest to an image, and $N_4$ represents a refractive index of the third lens group at the d-line,
wherein each of the convex surfaces of the fourth lens group has a radius of curvature whose absolute value is smaller than that of the other surface of each lens.

2. The imaging lens according to claim 1, further satisfying conditional expression (3):

$$0.97 < |f_1|/f < 1.92 \quad (3)$$

wherein $f_1$ represents a focal length of the first lens group, and f represents a focal length of the imaging lens.

3. The imaging lens according to claim 2, further satisfying conditional expression (4):

$$0.65 < |f_2|/f < 1.30 \quad (4)$$

wherein $f_2$ represents a focal length of the second group, and f represents a focal length of the imaging lens.

4. The imaging lens according to claim 3, further satisfying conditional expression (5):

$$0.49 < |f_3|/f < 1.03 \quad (5)$$

wherein $f_3$ represents a focal length of the third lens group, and f represents a focal length of the imaging lens.

5. The imaging lens according to claim 4, further satisfying conditional expression (6):

$$v_4 < 30 \quad (6)$$

wherein $v_4$ represents an Abbe number of the biconcave lens of the third lens group at the d-line.

6. The imaging lens according to claim 5, wherein each of the convex surfaces of the second lens group, which are arranged opposite to each other, has a radius of curvature whose absolute value is smaller than that of the other surface of each lens.

7. An imaging apparatus comprising:
an imaging lens according to claim 6; and
an imaging device that converts an optical image formed by the imaging lens into an electric signal.

8. The imaging lens according to claim 1, further satisfying conditional expression (4):

$$0.65 < |f_2|/f < 1.30 \quad (4)$$

wherein $f_2$ represents a focal length of the second group, and f represents a focal length of the imaging lens.

9. The imaging lens according to claim 8, further satisfying conditional expression (5):

$$0.49 < |f_3|/f < 1.03 \quad (5)$$

wherein $f_3$ represents a focal length of the third lens group, and f represents a focal length of the imaging lens.

10. The imaging lens according to claim 9, further satisfying conditional expression (6):

$$v_4 < 30 \quad (6)$$

wherein $v_4$ represents an Abbe number of the biconcave lens of the third lens group at the d-line.

11. The imaging lens according to claim 1, further satisfying conditional expression (5):

$$0.49 < |f_3|/f < 1.03 \quad (5)$$

wherein $f_3$ represents a focal length of the third lens group, and f represents a focal length of the imaging lens.

12. The imaging lens according to claim 11, further satisfying conditional expression (6):

$$v_4 < 30 \quad (6)$$

wherein $v_4$ represents an Abbe number of the biconcave lens of the third lens group at the d-line.

13. The imaging lens according to claim 1, further satisfying conditional expression (6):

$$v_4 < 30 \quad (6)$$

wherein $v_4$ represents an Abbe number of the biconcave lens of the third lens group at the d-line.

14. An imaging apparatus comprising:
an imaging lens according to claim 1; and
an imaging device that converts an optical image formed by the imaging lens into an electric signal.

15. The imaging lens according to claim 1, wherein an aperture diaphragm is located in back of the second lens group.

* * * * *